United States Patent [19]

Bone

[11] Patent Number: 5,518,440
[45] Date of Patent: May 21, 1996

[54] POWER TOOL FLANGE LOCK

[75] Inventor: Daniel Bone, Langley Moor, England

[73] Assignee: Black & Decker Inc., Newark, Del.

[21] Appl. No.: 269,468

[22] Filed: Jun. 30, 1994

[30] Foreign Application Priority Data

Jul. 1, 1993 [GB] United Kingdom ............ 9313632

[51] Int. Cl.$^6$ .................................. B24B 41/00
[52] U.S. Cl. .......................... 451/342; 451/510
[58] Field of Search ........................ 451/342, 508,
451/509, 510, 521; 125/12, 13.01; 83/469,
481, 491, 698.41, 666; 279/140; 30/500;
411/378, 408, 432, 917

[56] References Cited

U.S. PATENT DOCUMENTS

| | | | |
|---|---|---|---|
| 3,431,811 | 12/1966 | Yonkers | 411/432 |
| 3,440,915 | 2/1967 | Weyant | 83/666 |
| 4,637,170 | 1/1987 | Block | 451/510 |
| 4,976,071 | 12/1990 | Stabler . | |
| 5,190,423 | 3/1993 | Ewing | 411/432 |

FOREIGN PATENT DOCUMENTS

| | | |
|---|---|---|
| 0381809 | 7/1989 | European Pat. Off. . |
| 0334864 | 2/1993 | European Pat. Off. . |
| 3643067 | 6/1988 | Germany . |
| 3903766 | 8/1990 | Germany . |
| 3903765 | 8/1990 | Germany . |

Primary Examiner—Bruce M. Kisliuk
Assistant Examiner—Derris H. Banks
Attorney, Agent, or Firm—Dennis A. Dearing; John D. Del Ponti; Charles E. Yocum

[57] ABSTRACT

A flange lock 10 for retaining a disc or blade on a spindle of a power tool and for facilitating removal therefrom, comprising a support member 22 for threadedly engaging a spindle of a power tool, a plurality of cam devices 30 mounted through the support member 22, a pressure plate 44 for applying pressure to a flange of a disc or blade to hold the disc or blade on the power tool, the pressure plate 44 including a cam surface 46 for bearing against the cam devices 30, and a housing for receiving the support member 22, the cam devices 30 and the pressure plate 44 and including means 14, 34 for driving the cam devices 30 between an active position (FIG. 3 ) in which the pressure plate 44 is held spaced from the support member 22 and an inactive position (FIG. 2 ), wherein the flange lock 10 can be partially released to facilitate removal of a disc or blade from the spindle of the power tool by operating the drive means 14, 34 to move the cam devices 30 into their inactive position and thereby allow pressure between the pressure plate 44 and the disc or blade to be reduced. Such a flange lock 10 is particularly useful for use with angle grinders and circular saws which, after use, often have their flange locks extraordinarily tight.

14 Claims, 2 Drawing Sheets

POWER TOOL FLANGE LOCK

BACKGROUND OF THE INVENTION

This invention relates to flange locks for securing rotary discs on to the spindles of power tools, such as a grinding wheel on to the spindle of an angle grinder or a circular saw blade on to the spindle of a circular saw.

Conventionally the spindles of such tools are screw threaded and the discs have been secured by a clamp nut which is locked in place by a spanner and which must also be released by use of the spanner. More recently flange locks have been developed which can be safely secured and released by hand without the use of a tool and examples of such flange locks are to be found in U.S. Pat. Nos. 4,850,154, 4,941,790 and 5,042,207, and European Patent Application 0381809.

SUMMARY OF THE INVENTION

It is an aim of the present invention to provide an improved flange lock which can be secured and released by hand.

To this end, the present invention provides a flange lock for retaining a disc or blade on a spindle of a power tool and for facilitating removal therefrom, comprising a support member for threadedly engaging a spindle of a power tool, a plurality of cam devices mounted through the support member, a pressure plate for applying pressure to a flange of a disc or blade to hold the disc or blade on a power tool during use, the pressure plate including a cam surface for bearing against the cam devices, and a housing for receiving the support member, the cam devices and the pressure plate, the housing including means for driving the cam devices between an active position in which the pressure plate is held spaced from the support member and an inactive position, wherein the flange lock can be partially released to facilitate removal of a disc or blade from the spindle of the power tool by operating the drive means to move the cam devices into their inactive position and thereby allow pressure between the pressure plate and the disc or blade to be reduced.

Once the cam devices are in their inactive position, the flange lock can be readily unscrewed from the spindle of the power tool. The ability to relieve the pressure between the pressure plate and a disc of an angle grinder, for example, is particularly useful because clamp nuts on angle grinders tend to become extraordinarily tight in use, particularly when using large discs.

Preferably the drive means rotate the cam devices between their active and inactive positions. More preferably, the drive means include a gear pinion integral with the housing which interacts with gear wheel sectors attached to the cam devices.

The cam devices may each include a square stud which engages in a square hole in its respective sector. Other forms of interengagement between the cam devices and the gear wheel sectors can, of course, alternatively be used.

Preferably the cam devices are rotated through 90° when moving from their active to their inactive positions.

The pressure plate preferably includes a central bore having flats which abut flat walls extending from the support member to ensure that the support member and the pressure plate do not rotate independently. In this way, wear between the cam devices and the pressure plate can be avoided.

The support member may include a central threaded aperture for receiving a spindle of a power tool. Alternatively, the support member may include an axial threaded stud for engaging in a threaded bore of a spindle of a power tool.

The cam surface of the pressure plate preferably comprises a circular rib. If this is the case, each cam device preferably includes a groove having a profile complementary to the cam surface of the pressure plate such that, in their inactive position, the cam devices straddle the cam surface of the pressure plate.

Alternatively, in another embodiment of the present invention, each cam device includes an helical cam profile and the pressure plate includes a plurality of corresponding helical cam profiles for interaction therewith.

The support member preferably includes a friction device to ensure that the cam devices are in their active position before the flange lock is tightened onto a spindle of a power tool, in use. The friction device may comprise a nylon plug in the threaded portion of the support member.

The support member, cam devices and pressure plate are preferably held in the housing by means of a circlip which engages a groove in the inside surface of the housing. Other methods of retention can, of course, alternatively be used.

BRIEF DESCRIPTION OF THE DRAWINGS

Specific embodiments of the present invention are now described, by way of example only, with reference to the accompanying drawings, in which.

DESCRIPTION OF PREFERRED EMBODIMENT

Figure 1:
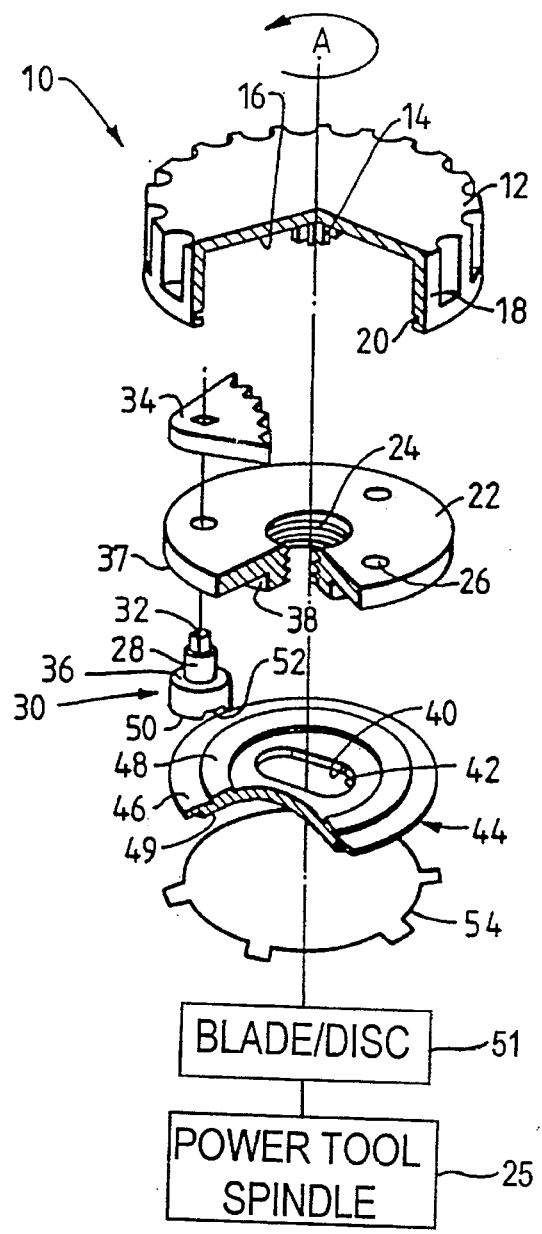
FIG. 1. is an exploded view of a clamp nut according to the present invention.
Figure 4:
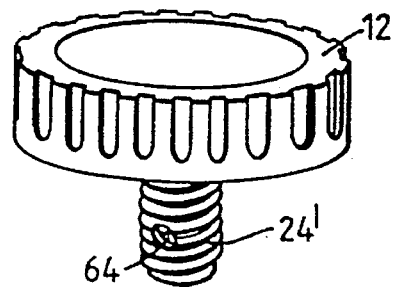
FIG. 4 is a perspective view of a clamp bolt according to the present invention when assembled.
Figure 2:
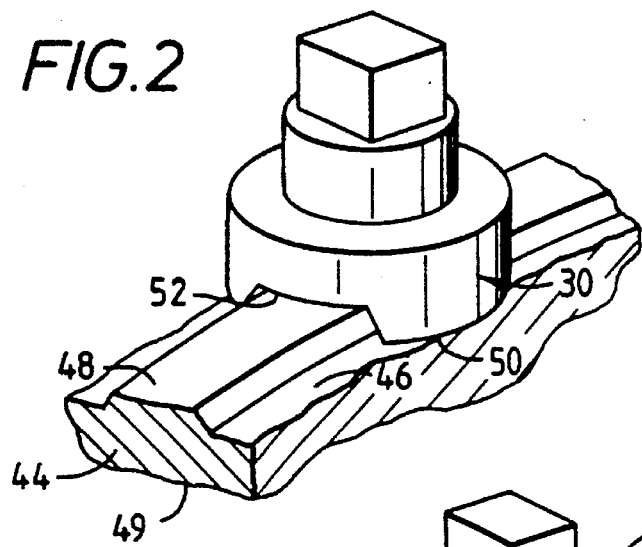
FIGS. 2 and 3 are detailed views of the cam mechanism in collapsed and jacked positions respectively.
Figure 3:
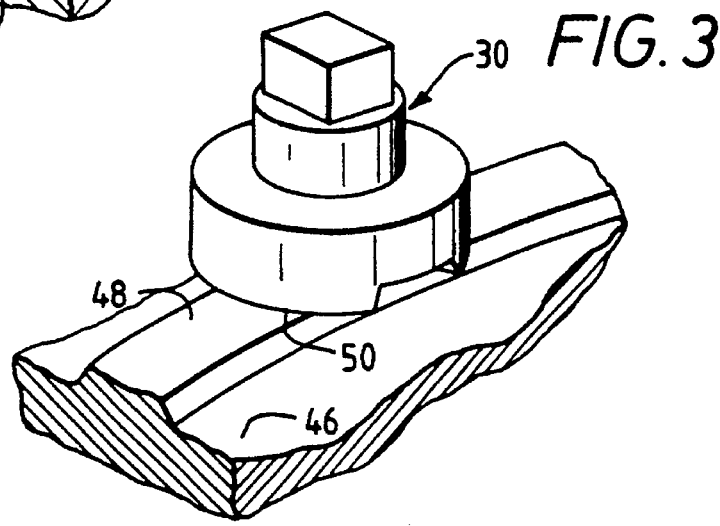

With reference to FIGS. 1–3, a clamp nut 10 comprises a cap 12 having a central gear pinion 14 formed in its base 16. The cap 12 has sides 18. A groove 20 is formed around the inside edge of the sides 18. A thread (or support) member 22 has a central threaded bore 24 for engagement with an external spindle 25 of an angle grinder. In FIG. 4, the threaded bore 24 is replaced by a threaded stud 24' engaging in a threaded bore of a spindle therefor a circular saw. Of course, either arrangement can be used with both an angle grinder or a circular saw depending on the form of the drive spindle.

The thread member 22 has three spaced bores 26 which each receive a circular shaft 28 of a cam mechanism (or device) 30. The shaft 28 of each mechanism 30 has a non-circular stud 32 which projects through the bore 26 and is rotationally fixed to a gear wheel sector 34. The gear wheel sector 34 is adapted to engage the gear pinion 14. Thus, rotation of the pinion 14, through the cap 12, rotates each cam mechanism 30 through about 90°.

Each cam mechanism 30 has a shoulder 36 which abuts the under surface 37 of the thread member 22. The under surface 37 is provided with a downwardly depending flange 38 which has flats (not shown) for engagement with corresponding flats 40 formed in a bore 42 of a pressure plate 44. Thus, the thread member 22 and the pressure plate 44 rotate together. Top surface 46 of the pressure plate 44 has a circular rib 48 formed thereon. The under surface 49 of the pressure plate 44 is adapted to abut a disc or blade 51 of the angle grinder or saw (neither shown) and will generally have a coarse surface finish for functional engagement with blade or disc.

The under surface 50 of each cam mechanism 30 is provided with a groove 52 of corresponding profile to the rib 48. Referring to FIG. 2, in a first (inactive) rotational position of the cam mechanism 30, the slot 52 is aligned with the rib 48 so that the bottom surface 50 of the cam mechanism 30 abuts the top surface 46 of the pressure plate 44. In a second (active) rotational position of the cam mechanism 30, shown in FIG. 3, the bottom surface 50 abuts the rib 48 and consequently the separation of the pressure plate 44 and the thread member 22 is greater in FIG. 3 than it is in FIG. 2.

When assembled, a circlip 54 retains the pressure plate 44 and intervening components 30, 22, 34 within the cap 12, the circlip 54 engaging the groove 20. Before or during connection of the clamp nut 10 to the spindle of an angle grinder or circular saw, cap 12 is rotated in a tightening direction (opposite to Arrow A in FIG. 1) relative to the thread member 22. This serves to rotate the gear wheel sectors 34 so that the cam mechanisms 30 adopt the active position shown in FIG. 3. In this position the thread member 22 and the pressure plate 44 have their maximum separation. The thread 24 is then engaged with the spindle and the nut 10 is rotated in the tightening direction until the under surface 49 of the pressure plate 44 engages the abrasive disc or blade, as the case may be. Operation of the grinder/saw serves to tighten further the nut 10 against the disc/blade.

When it is desired to remove the disc/blade, cap 12 is rotated in an unscrewing direction (Arrow A in FIG. 1). This first of all serves to rotate the gear wheel sectors 34 until the cam mechanisms 30 adopt the position shown in FIG. 2, whereupon the separation of the pressure plate 44 and the thread member 22 is reduced sufficiently to loosen the connection between the thread 24 and the spindle of the grinder/saw. Further rotation of the cap 12 then serves to rotate the thread member 22 when the sectors 34 abut the sides 18 of the cap 12. When this occurs, the thread member 22 is unscrewed from the spindle.

Figure 5:
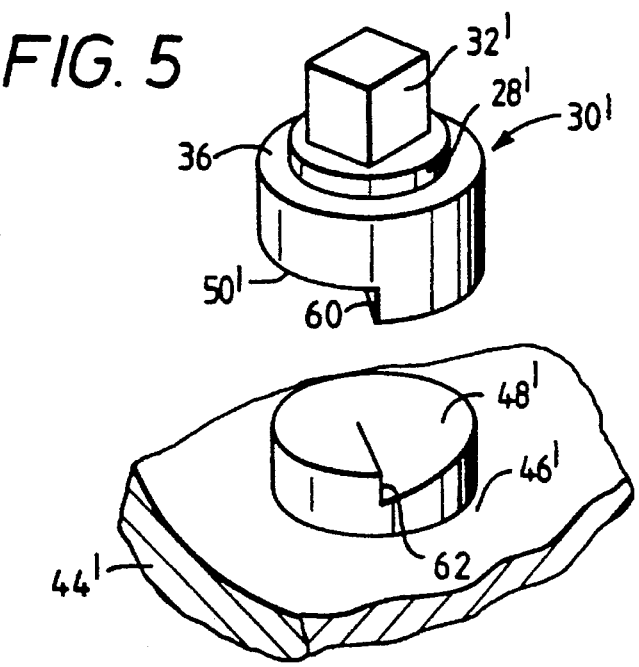
FIG. 5 is a perspective view of an alternative embodiment of the cam mechanism.

It will be appreciated that the surface 50 and the slot 52 of each cam mechanism 30 will snap into engagement with the rib profile 48 and the surface 46 of the pressure plate 44 during rotation of the cap 12, and that this may lead to undesirable wear of the contact parts. Consequently, FIG. 5 shows an alternative embodiment of the cam mechanism 30' wherein the under surface 50' of the cam mechanism is formed with an helical land. A corresponding helical profile 48' is formed on the upper surface 46' of the pressure plate 44'. A triangular step 60 is thus formed on the surface 50' and likewise a step 62 on the land 48'. When the two steps 60, 62 abut one another there is a minimum separation between the thread member 22 and the pressure plate 44'. When, however, the cam mechanism 30' is rotated by up to 90° or more, the separation is increased. However, there is only a gradual transition between the collapsed and jacked conditions, which reduces the tendency for undesirable wear.

As should be appreciated from the foregoing, it is important that the nut 10 be in the condition where the thread member 2 and pressure plate 44 are at their maximum separation before the nut is engaged with the disc/blade, otherwise the clamp nut 10 fails to function. For this purpose, in the case of stud 24' in FIG. 4, a nylon plug or patch 64 is inserted in a cross bore of the stud. This serves to increase friction with the corresponding thread of the spindle when the patch engages the spindle so that turning of the cap 12 in the tightening direction serves then to rotate the gear wheel sectors 34 rather than rotate the thread member 22. The cam mechanisms 30 therefore adopt their jacked position (FIG. 3) and it is only when the sectors 34 engage the sides 18 of the cap 12 that further rotation thereof is prevented and the cap begins again to rotate the thread member 22. At this point, the resistance offered by the nylon plug 64 is overcome and engagement of the stud 24' in the spindle continues. A similar plug (not shown) can also be inserted in the threaded bore 24.

It will of course be understood that the present invention has been described above purely by way of example, and that modifications of detail can be made within the scope of the invention.

I claim:

1. A flange lock for retaining a disc or blade on a power tool spindle and for facilitating removal therefrom, comprising a support member for threadably engaging the power tool spindle, a plurality of cam devices mounted through the support member, a pressure plate for applying pressure to a flange of the disc or blade to hold the disc or blade on the power tool spindle, the pressure plate including a cam surface for bearing against the cam devices, and a housing for receiving the support member, the cam devices and the pressure plate and including means for driving the cam devices between an active position in which the pressure plate is held spaced from the support member and an inactive position, in which said spacing is reduced.

2. A flange lock as claimed in claim 1, wherein the drive means rotates the cam devices between their active and inactive positions.

3. A flange lock as claimed in claim 2, wherein the drive means includes a gear pinion integral with the housing which interacts with gear wheel sectors attached to the cam devices.

4. A flange lock as claimed in claim 3, wherein the cam devices each includes a square stud which engage a square aperture in its respective gear wheel sector.

5. A flange lock as claimed in claim 1, wherein the cam devices are rotated about 90° when moving from their active to their inactive positions.

6. A flange lock as claimed in claim 1 wherein the pressure plate includes a central bore having flats which abut flat walls extending from the support member to ensure that the support member and the pressure plate do not rotate independently.

7. A flange lock as claimed in claim 1, wherein the support member includes a central threaded aperture for receiving the power tool spindle.

8. A flange lock as claimed in claim 1, wherein the support member includes an axial threaded stud for engaging in a threaded bore of the power tool spindle.

9. A flange lock as claimed in claim 1, wherein the cam surface of the pressure plate comprises a circular rib.

10. A flange lock as claimed in claim 1, wherein each cam device includes a groove having a profile complementary to the cam surface of the pressure plate such that, in their inactive position, the cam devices straddle the cam surface of the pressure plate.

11. A flange lock as claimed in claim 1, wherein each cam device includes a helical cam profile and the cam surface of the pressure plate includes a plurality of corresponding helical cam profiles for interaction therewith.

12. A flange lock as claimed in claim 1, wherein the support member includes a friction device to ensure that the cam devices are in their active position before the flange lock is tightened onto the power tool spindle.

13. A flange lock as claimed in claim 12, wherein the friction device comprises a nylon plug in the threaded portion of the support member.

14. A flange lock as claimed in claim 1, wherein the support member, the cam devices and the pressure plate are held in the housing by means of a circlip which engages a groove in the inside surface of the housing.

* * * * *